Sept. 14, 1937.  M. E. McLEAN  2,092,810
GAS PRODUCING APPARATUS
Filed March 30, 1936  2 Sheets-Sheet 2

Inventor
Malcolm Edwards McLean
By Frederick E. Bromley
Attorney

Patented Sept. 14, 1937

2,092,810

UNITED STATES PATENT OFFICE 2,092,810

GAS PRODUCING APPARATUS

Malcolm Edwards McLean, Nelson Township, Halton County, Ontario, Canada, assignor of one-tenth to Andrew Leonard Laing, York, Ontario, Canada Application March 30, 1936, Serial No. 71,551

7 Claims. (Cl. 261—106)

The invention relates to improvements in gas producing apparatus as described in the present specification and shown in the accompanying drawings which form part of the same.

The invention comprehends an apparatus for the production of carbureted air from light hydrocarbon oils and has for its object to furnish a serviceable and practical carburetor by which a uniform grade of gaseous mixture is generated and controlled.

A further object of the invention is to provide an economical gas-producing device that is inexpensive to manufacture and reliable in use.

A salient feature of invention resides in the arrangement of an upper compartment supplied with a series of baffles composed of screens with an interposed layer of mineral wool of suitable density which permit air to be drawn therethrough. The baffles are maintained in saturated condition by a system of oil-feed supply. The baffles are preferably rearwardly inclined; and in addition to functioning the carbureted air passing therethrough, they also serve to deflect air downwardly so as to cause same to pass through a similar but horizontally arranged baffle into an oil preheating compartment in which the air may more readily become impregnated with vaporized oil.

A further feature lies in the construction and arrangement of the preheating system and the control therefor, and also in the spraying system of the oil-feed supply.

Referring to the accompanying drawings, Figure 1 is a vertical sectional view through the carbureting chamber and showing the other parts in elevation.

Like numerals of reference indicate corresponding parts in each of the figures throughout the drawings of the invention.

Figure 1:
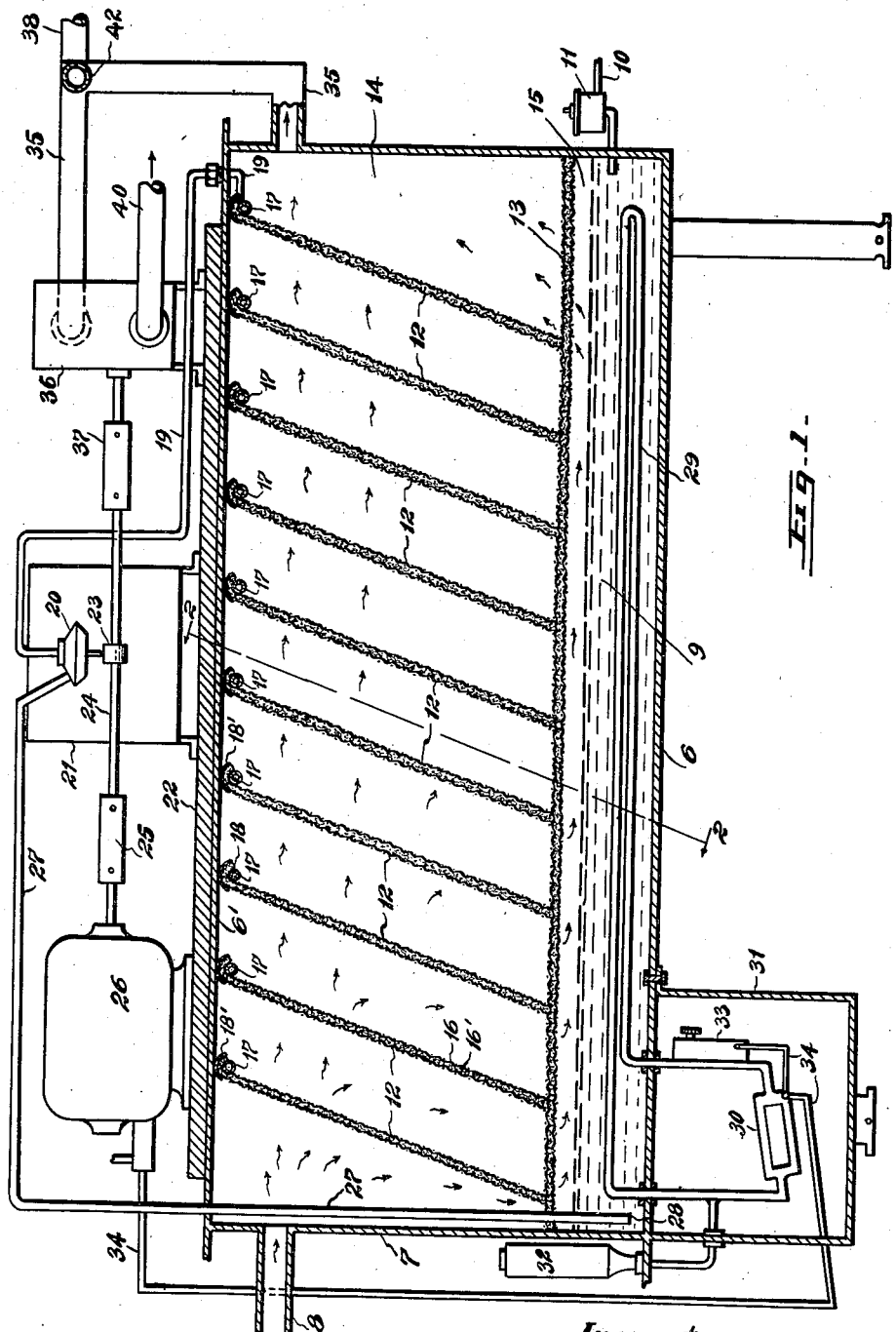
Figure 2:
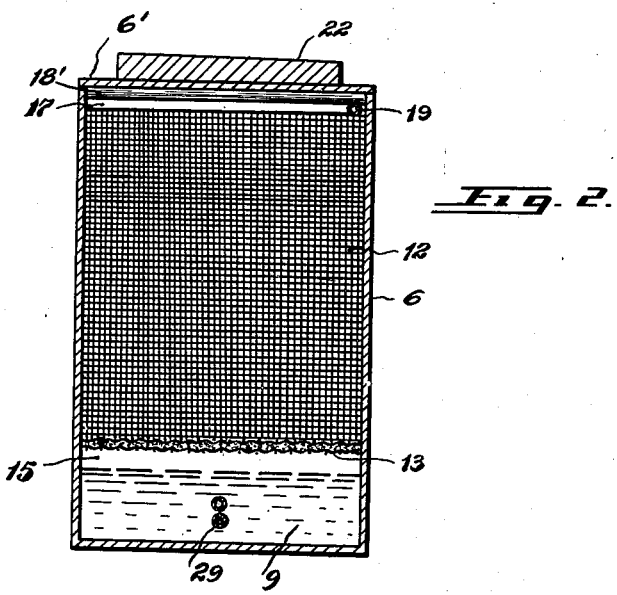
Figure 2 is a cross section taken on line 2—2 of Figure 1.
Figure 3:
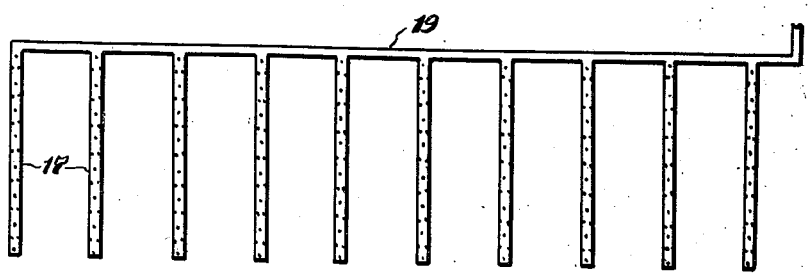
Figure 3 is a detail of the spraying nozzles for the inclined baffles.

In the drawings, the reference numeral 6 generally denotes the carbureting chamber which is shown as an elongated member of a rectangular cross section. The front end 7 has an inlet 8 for admission of air, which inlet is in the vicinity of the top 6'. The bottom of the chamber contains a body of light hydrocarbon oil 9 maintained at a substantially constant level by a suitable source of supply, such as indicated at 10, controlled by a conventional float-valve mechanism denoted at 11.

Within the chamber is a series of spaced baffles 12 transversely arranged and rearwardly inclined, which baffles terminate short of the body of oil 9. Contiguous with the lower ends of said baffles is a horizontal baffle 13 elevated slightly from the liquid 9 in order to separate the chamber into an upper compartment 14 and a lower compartment 15 having a vapor space immediately over the liquid aforesaid.

The baffles are similarly constructed and each consists of a pair of suitable mesh screens 16 with an interposed layer or filler of mineral wool 16' of suitable density. The mineral wool has been found to be particularly advantageous in this capacity and does not possess capillary attraction which is not desirable as a property for effective carburetion of air in the present apparatus.

The inclined baffles are maintained in a constantly saturated condition by a system of oil supply comprising sprayer nozzles 17 individually extending alongside of the upper end of each baffle so that jets of oil may be discharged onto the baffles, the liquid thus diffused thereover gravitating to the bottom thereof. Any surplus may of course gravitate to the body of liquid 9 from which the supply originates.

Figure 4:
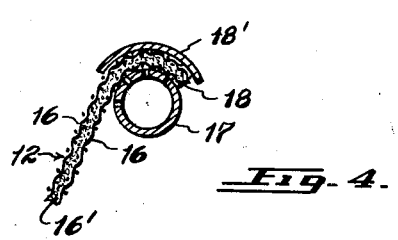
Figure 4 is an enlarged detail of the upper end of one of the inclined baffles in conjunction with a spraying nozzle and hood for deflection of oil jets.

The upper ends of the inclined baffles are preferably curved over the respective nozzles as at 18 and an imperforate hood 18' is disposed over such curved portions as will be better understood from an inspection of Figure 4. The arcuate hoods form deflectors to assist in diffusing the hydrocarbon oil over their baffles.

The nozzles are fed by a piping 19 from a pump 20 mounted on the supporting element 21 resting on the base 22. The pump is of known type and may be actuated by a cam mechanism 23 on the shaft 24, which is shown as coupled at 25 to an electric motor 26. The pump draws its supply through a piping 27 extending into the chamber with its inlet end 28 immersed in the body of hydrocarbon oil 9. Accordingly, it will be understood that the pump will deliver oil to the nozzles in the operation of the motor to assure a predetermined amount being supplied to the inclined baffles 12.

The preheating system comprises an immersion coil 29 continued downwardly through the bottom of the chamber and supplied with a sub-mounted electric heating unit 30 contained in the housing 31. The coil is coextensive with the chamber and is adapted to contain water or oil as the heating medium, which is circulated therein by convection. An expansion tank 32 or the like may be connected to the coil and located externally of the chamber. A conventional thermostatic control is shown at 33 for regulating the temperature, which control is of the adjustable type. The electric conduit for the heater and the thermostatic control is denoted at 34.

The carbureted air or gas is drawn off at the rear of the chamber through the outlet 35 by means of the exhauster or pump 36. This pump is mounted on the base 22 and coupled at 37 to the shaft 24 so as to be operated by the motor in synchronism with the other operating elements heretofore described. The discharge duct of this pump is denoted at 40. The pump may have suitable means associated with it for attenuating the gaseous mixture, of which the numerals 38 and 40 denote the connections thereof to the outlet 35. However, since such means do not form a part of the present invention they are therefore not further recounted.

As a recapitulation of the operation it will be gathered that as the device draws in air through the inlet 8 by suction of the exhauster or pump 36 such air impinges upon the initial inclined baffle, and a portion of it is diverted downwardly through the horizontal baffle 13 into the lower compartment 15 so as to commingle with the hydrocarbon vapor. Air passes through the successive oil-laden baffles in this manner with a portion thereof deflected into the oil vapor. This insures complete and uniform mixing of air and oil within the chamber. The carbureted air is discharged by means of the pump. It is apparent that a plurality of the chambers could be constructed so as to operate in series if so desired, which is within the spirit and scope of the invention.

What I claim is:—

1. In a gas producing apparatus, a chamber having an upper compartment and a lower compartment, an air pervious element forming a divisional wall between the compartments, an air inlet for the upper compartment, a gas discharge outlet therefor, means for producing a suction through the outlet, the lower compartment of the chamber being adapted to contain a body of light hydrocarbon oil with a vapor space thereover separated from said upper compartment by the aforesaid air-pervious element, a series of transverse baffles in the upper compartment disposed substantially vertically in spaced relation, said baffles consisting of screens having intervening layers of mineral wool, and means for diffusing hydrocarbon oil over the baffles.

2. In a gas producing apparatus, a chamber, an air inlet therefor, a gas discharge outlet, means for producing a suction therethrough, a series of spaced baffles substantially vertically disposed between the inlet and the outlet, said baffles extending from the top of the chamber and terminating short of the bottom thereof, a horizontal baffle meeting the bottoms of the said baffles and spaced from the bottom of the aforesaid chamber so as to define a lower compartment adapted to contain a body of hydrocarbon oil and a vapor space thereover, said horizontal baffle and the said substantially vertically disposed baffles consisting of carbureting members, including a fibrous mass pervious to air and means for diffusing hydrocarbon oil over the vertical baffles.

3. In a gas producing apparatus, a chamber having an upper compartment and a lower compartment, a pervious element forming a division between the compartments, an air inlet for the upper compartment, a gas discharge outlet therefor, means for producing a suction through the outlet, the lower compartment of the chamber being adapted to contain a body of hydrocarbon oil with a vapor space thereover, an immersion heater provided in the lower compartment, a series of transverse baffles in the upper compartment disposed substantially vertically in spaced relation, said baffles consisting of screens having intervening layers of mineral wool, and means for diffusing hydrocarbon oil over the baffles.

4. In a gas producing apparatus, a chamber having an upper compartment and a lower compartment, a pervious element forming a division between the compartments, an air inlet for the upper compartment, a gas discharge outlet therefor, means for producing a suction through the outlet, the lower compartment of the chamber being adapted to contain a body of hydrocarbon oil with a vapor space thereover, means for maintaining the oil at a constant level, a fluid heating-coil mounted in the lower compartment and extending outwardly therefrom, an electric heating unit connected with the coil externally of the compartment, a thermostatic control therefor, an expansion tank connected with the coil, and a series of transverse carbureting baffles in the upper compartment vertically arranged in spaced relation.

5. In a gas producing apparatus, a chamber having an upper compartment and a lower compartment, a pervious element forming a division between the compartments, an air inlet for the upper compartment, a gas discharge outlet therefor, means for producing a suction through the outlet, the lower compartment of the chamber being adapted to contain a body of hydrocarbon oil with a vapor space thereover, means for maintaining the oil at a constant level, a fluid heating-coil mounted in the lower compartment and extending outwardly therefrom, means connected with said fluid heating-coil externally of the lower compartment for heating fluid therein, and a series of transverse carbureting baffles in the upper compartment substantially vertically arranged in spaced relation.

6. In a gas producing apparatus, a chamber having an upper compartment and a lower compartment, a pervious element forming a division between the compartments, an air inlet for the upper compartment, a gas discharge outlet therefor, means for producing a suction through the outlet, the lower compartment of the chamber being adapted to contain a body of hydrocarbon oil with a vapor space thereover, an immersion heater provided in the lower compartment, a series of transverse baffles in the upper compartment disposed substantially vertically in spaced relation, said baffles consisting of carbureting members, and means for delivering the hydrocarbon oil to said baffles.

7. In a gas producing apparatus, a chamber horizontally divided by an air-pervious element into an upper compartment and a lower compartment, said divisional element consisting of reticulate members and a mass of intervening mineral wool, an air inlet for the upper compartment, a gas discharge outlet for this compartment, the lower compartment being adapted to contain a body of hydrocarbon oil with a vapor space thereover, means for heating the body of hydrocarbon oil, a series of transverse baffles in the upper compartment disposed substantially vertically in spaced relation, said baffles consisting of screens having intervening masses of mineral wool, and means for diffusing hydrocarbon oil over said baffles.

MALCOLM EDWARDS McLEAN.